(12) United States Patent
Hsiao et al.

(10) Patent No.: US 10,921,163 B2
(45) Date of Patent: Feb. 16, 2021

(54) OPTICAL ENCODER WITH INCREMENTAL AND ABSOLUTE CODE SENSORS AND DEFINING DISTANCE BETWEEN GEOMETRIC CENTERS OF ADJACENT PHOTOSENSORS OF AN INCREMENTAL CODE SENSOR

(71) Applicant: HIWIN MIKROSYSTEM CORP., Taichung (TW)

(72) Inventors: Heng-Sheng Hsiao, Taichung (TW); Yin-Yuan Chen, Taichung (TW); Tsan-Lin Chen, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 251 days.

(21) Appl. No.: 16/053,508

(22) Filed: Aug. 2, 2018

(65) Prior Publication Data

US 2020/0041312 A1    Feb. 6, 2020

(51) Int. Cl.
*G01D 5/347* (2006.01)

(52) U.S. Cl.
CPC ....... *G01D 5/34792* (2013.01); *G01D 5/3473* (2013.01); *G01D 5/34715* (2013.01)

(58) Field of Classification Search
CPC ............ G01D 5/34792; G01D 5/3473; G01D 5/34715
See application file for complete search history.

(56) References Cited

U.S. PATENT DOCUMENTS

| 4,945,231 | A | 7/1990 | Ohya et al. |
| 5,825,307 | A | 10/1998 | Titus et al. |
| 9,933,284 | B2 * | 4/2018 | Goldman ........... G01D 5/34776 |
| 2008/0252906 | A1 | 10/2008 | Kusano |
| 2011/0068731 | A1 | 3/2011 | Yoshida et al. |
| 2015/0354992 | A1 * | 12/2015 | Murokita ........... G01D 5/34715 |
| | | | 318/640 |
| 2017/0176218 | A1 * | 6/2017 | Kimura .................... G01D 5/38 |

FOREIGN PATENT DOCUMENTS

| DE | 69315128 T2 | 3/1998 |
| EP | 2743651 A2 | 6/2014 |

OTHER PUBLICATIONS

Office Action issued in German counterpart application No. 102018212788.3 by the DPMA dated May 16, 2019.

\* cited by examiner

*Primary Examiner* — Jennifer D Bennett
(74) *Attorney, Agent, or Firm* — Birch, Stewart, Kolasch & Birch, LLP

(57) ABSTRACT

An optical positioning measurement device includes a light source module operable to emit light, an encoder module and a sensor module. The sensor module is configured to output electric signals relating to luminous flux of light received thereby via the encoder module. The encoder module having a first incremental code portion, a second incremental code portion and an absolute code portion. The first incremental code portion includes multiple first incremental code patterns that are equally distributed. The second incremental code portion includes multiple second incremental code patterns that are equally distributed. The second incremental code patterns are arranged more loosely than the first incremental code patterns.

10 Claims, 9 Drawing Sheets

OPTICAL ENCODER WITH INCREMENTAL AND ABSOLUTE CODE SENSORS AND DEFINING DISTANCE BETWEEN GEOMETRIC CENTERS OF ADJACENT PHOTOSENSORS OF AN INCREMENTAL CODE SENSOR

FIELD

The disclosure relates to a positioning measurement device, and more particularly to an optical encoding and sensing device used for positioning measurement.

BACKGROUND

In general, precision machinery (e.g., servomotors) may utilize an optical encoder for measuring or tracking an operating position of a mechanical component (e.g., a rotor), thereby achieving precise control.

Conventional optical encoders may be classified into rotary encoder and linear encoders according to manners of movement, or into incremental encoders and absolute encoders according to manners of encoding. Incremental encoders use two signals in quadrature (i.e., a phase difference therebetween is 90 degrees) to acquire positional variations. Absolute encoders use angularly or linearly pre-defined codes to acquire a current position.

However, incremental encoders are disadvantageous in that the absolute position of the mechanical component cannot be confirmed and that the reset of the origin is required every time the machinery is turned on, while absolute encoders are disadvantageous in that the resolution thereof is limited by the number of bits used for encoding.

SUMMARY

Therefore, an object of the disclosure is to provide an optical positioning measurement device that can alleviate at least one of the drawbacks of the prior art.

According to the disclosure, the optical positioning measurement device includes a light source module, an encoder module and a sensor module. The light source module is operable to emit light. The encoder module is disposed to be illuminated by the light source, and is movable relative to the light source module. The encoder module includes an encoder body, and further includes a first incremental code portion, a second incremental code portion and an absolute code portion that are disposed on the encoder body. The sensor module is disposed to receive light provided by the light source module via the encoder module, and is configured to output electric signal relating to luminous flux of light received thereby. The sensor module includes a first incremental code sensor unit, a second incremental code sensor unit and an absolute code sensor unit. The first incremental code sensor unit corresponds in position to the first incremental code portion for receiving light provided via the first incremental code portion, and is configured to output a first incremental code signal relating to light received thereby. The second incremental code sensor unit corresponds in position to the second incremental code portion for receiving light provided via the second incremental code portion, and is configured to output a second incremental code signal relating to light received thereby. The absolute code sensor unit corresponds in position to the absolute code portion for receiving light provided via the absolute code portion, and is configured to output an absolute code signal relating to light received thereby. The light source module, the encoder module and the sensor module are spaced apart from each other in a first direction. The first incremental code portion includes a plurality of first incremental code patterns that are equally distributed on the encoder body along a second direction, and the second incremental code portion includes a plurality of second incremental code patterns that are equally distributed on the encoder body along the second direction, where the second incremental code patterns are arranged more loosely than the first incremental code patterns.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
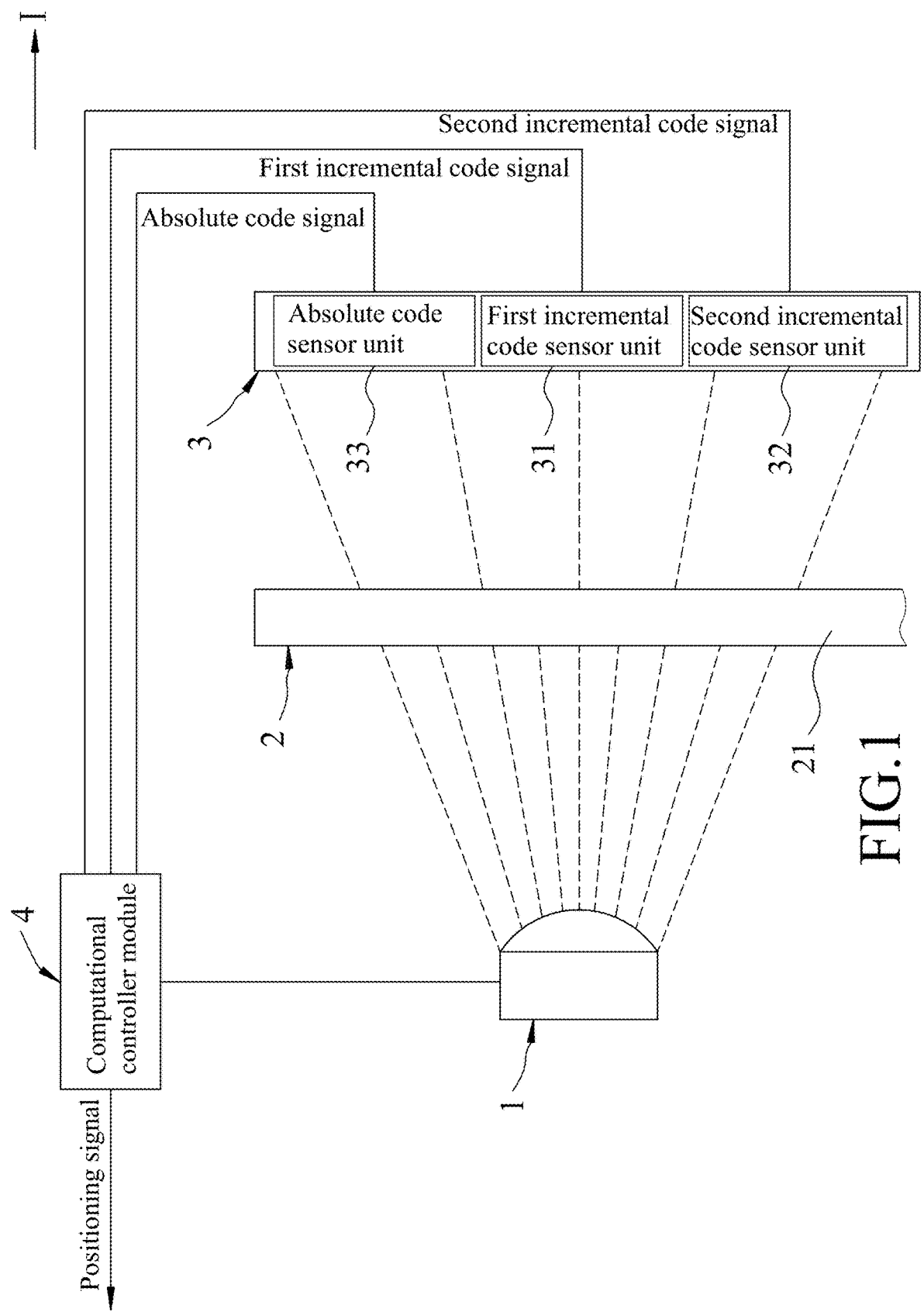
FIG. 1 is a schematic block diagram illustrating a first embodiment of an optical positioning measurement device according to the disclosure, where the optical positioning measurement device is of a light-transmissive and rotary type.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
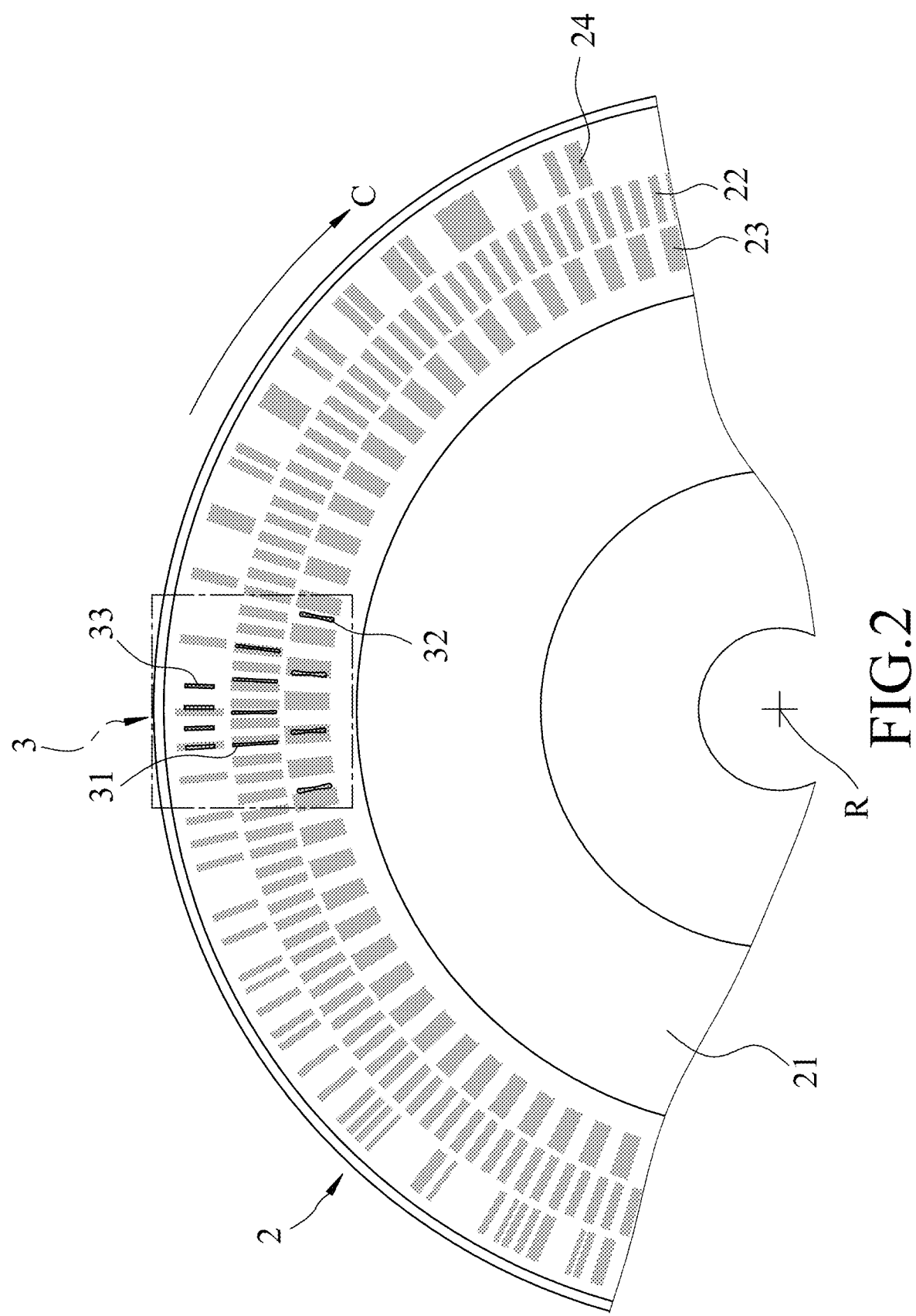
FIG. 2 is a fragmentary view illustrating an arrangement between an encoder module and a sensor module of the first embodiment.
Figure 3:
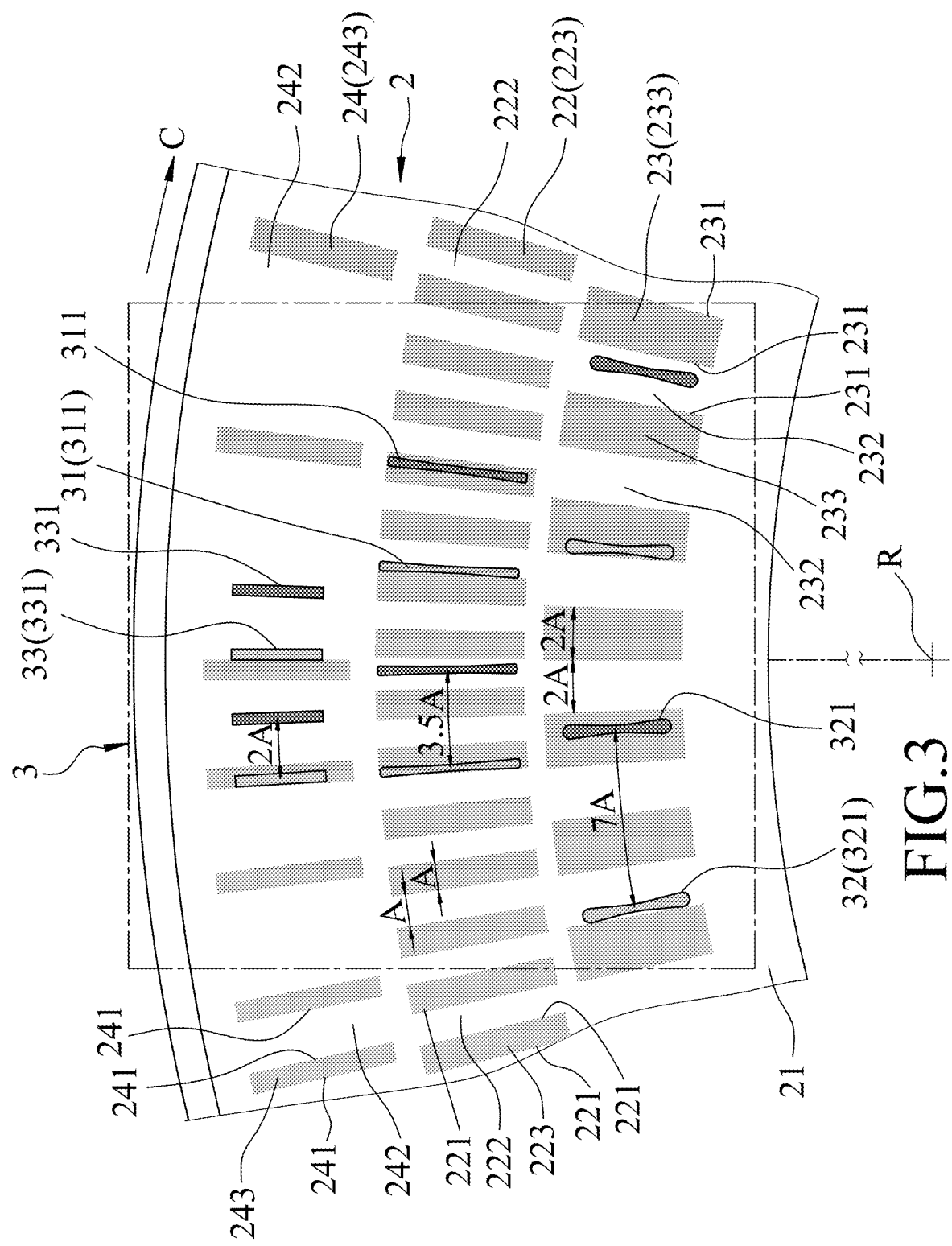
FIG. 3 is an enlarged fragmentary view of FIG. 2.

Referring to FIGS. 1 to 3, the first embodiment of the optical positioning measurement device according to this disclosure includes a light source module 1, an encoder module 2, a sensor module 3 and a computational controller module 4, where the light source module 1, the encoder module 2 and the sensor module 3 are spaced apart from each other in a first direction (I).

The light source module 1 is controlled by the computational controller module 4 to emit light. In this embodiment, the light source module 1 uses light emitting diodes (LEDs) to serve as its light source, but this disclosure is not limited in this respect.

In this embodiment, the encoder module 2 is disposed between the light source module 1 and the sensor module 3 (i.e., the light source module 1 and the sensor module 3 are disposed at opposite sides of the encoder module 2), is disposed to be illuminated by the light source module 1, and is rotatably movable about an axis (R) relative to the light source module 1 and the sensor module 3. The encoder module 2 includes an annular encoder body 21 surrounding the axis (R) along a circumferential direction (C), and further includes a first incremental code portion 22, a second incremental code portion 23 and an absolute code portion 24 that are disposed on the encoder body 21. In this embodiment, the second incremental code portion 23, the first incremental code portion 22 and the absolute code portion 24 are arranged in order from an inner part to an outer part of the encoder body 21, but this disclosure is not limited in this respect. The first incremental code portion 22 includes a plurality of first incremental code patterns (e.g., light and dark barcode patterns, which are introduced hereinafter) that are equally distributed in the circumferential direction (C) on the encoder body 21, and the second incremental code portion 23 includes a plurality of second incremental code patterns (e.g., light and dark barcode patterns, which are introduced hereinafter) that are equally distributed in the circumferential direction (C) on the encoder body 21, where the second incremental code patterns are arranged more loosely than the first incremental code patterns.

The first incremental code portion 22 has a plurality of first incremental barcode pattern boundaries 221 that are equiangularly arranged (equally distributed in an angular manner) along the circumferential direction (C) by an angular distance of A and that define a plurality of first incremental light barcode elements 222, and a plurality of first incremental dark barcode elements 223 which can be seen as the abovementioned first incremental code patterns. Arbitrary successive three of the first incremental barcode pattern boundaries 221 cooperatively define one of the first incremental light barcode elements 222 and one of the first incremental dark barcode elements 223 that are adjacent to each other. In other words, the first incremental light barcode elements 222 and the first incremental dark barcode elements 223 are arranged alternately.

The second incremental code portion 23 has a plurality of second incremental barcode pattern boundaries 231 that are equiangularly arranged along the circumferential direction (C) by an angular distance of 2 A and that define a plurality of second incremental light barcode elements 232, and a plurality of second incremental dark barcode elements 233 which can be seen as the abovementioned second incremental code patterns. Arbitrary successive three of the second incremental barcode pattern boundaries 231 cooperatively define one of the second incremental light barcode elements 232 and one of the second incremental dark barcode elements 233 that are adjacent to each other. In other words, the second incremental light barcode elements 232 and the second incremental dark barcode elements 233 are arranged alternately.

The absolute code portion 24 has a plurality of absolute barcode pattern boundaries 241 that are arranged along the circumferential direction (C) and that define a plurality of absolute light barcode elements 242 and a plurality of absolute dark barcode elements 243. Arbitrary successive three of the absolute barcode pattern boundaries 241 cooperatively define one of the absolute light barcode elements 242 and one of the absolute dark barcode elements 243 that are adjacent to each other. In other words, the absolute light barcode elements 242 and the absolute dark barcode elements 243 are arranged alternately. It is noted that the absolute light barcode elements 242 and the absolute dark barcode elements 243 are arranged along the circumferential direction (C) according to a specific encoding format (e.g., binary code, Gray code, binary-coded decimal, etc.), so angular distances among the absolute barcode pattern boundaries 241 may vary.

The sensor module 3 is disposed to receive light provided by the light source module 1 via the encoder module 2, and is configured to output electric signals relating to luminous flux of light received thereby. The sensor module 3 includes a first incremental code sensor unit 31 corresponding in position to the first incremental code portion 22 for receiving light provided via the first incremental code portion 22, a second incremental code sensor unit 32 corresponding in position to the second incremental code portion 23 for receiving light provided via the second incremental code portion 23, and an absolute code sensor unit 33 corresponding in position to the absolute code portion 24 for receiving light provided via the absolute code portion 24.

The first incremental code sensor unit 31 includes a plurality of first incremental code photo sensors 311 that are equiangularly arranged along the circumferential direction (C) where a geometric center of each of the first incremental code photo sensors 311 is spaced apart from that of an adjacent one of the first incremental code photo sensors 311 by an angular distance of A×(N−0.5), where N is a positive integer. The first incremental code photo sensors 311 generate electric signals in response to luminous flux of light received thereby, and the electric signals generated by the first incremental code photo sensors 311 cooperatively form a first incremental code signal.

The second incremental code sensor unit 32 includes a plurality of second incremental code photo sensors 321 that are equiangularly arranged along the circumferential direction (C) where a geometric center of each of the second incremental code photo sensors 321 is spaced apart from that of an adjacent one of the second incremental code photo sensors 321 by an angular distance of 2 A×(N−0.5). The second incremental code photo sensors 321 generate electric signals in response to luminous flux of light received thereby, and the electric signals generated by the second incremental code photo sensors 321 cooperatively form a second incremental code signal.

The absolute code sensor unit 33 includes a plurality of absolute code photo sensors 331 that are equiangularly arranged along the circumferential direction (C) where a geometric center of each of the absolute code photo sensors 331 is spaced apart from that of an adjacent one of the absolute code photo sensors 331 by an angular distance of 2 A. The absolute code photo sensors 331 generate electric signals in response to luminous flux of light received thereby, and the electric signals generated by the absolute code photo sensors 331 cooperatively form an absolute code signal.

In this embodiment, N=4, and each of the first incremental code photo sensors 311, the second incremental code photo sensors 321 and the absolute code photo sensors 331 is a photodiode, but this disclosure is not limited in this respect.

In this embodiment, the encoder body 21 is made of a light-transmissible/non-opaque material (e.g., transparent glass); each of the first incremental light barcode elements 222 is made of a light-transmissible/non-opaque material, so as to allow the light received thereby from the light source module 1 to reach the first incremental code sensor unit 31 by light transmission (i.e., the first incremental code photo sensors 311 receive light passing through the first incremental light barcode elements 222) when the first incremental light barcode element 222 is in a sensing zone of the first incremental code sensor unit 31; each of the first incremental dark barcode elements 223 is made of an opaque material, which may be coated on the encoder body 21, to prevent the light received thereby from the light source module 1 from reaching the first incremental code sensor unit 31; each of the second incremental light barcode elements 232 is made of a light-transmissible/non-opaque material, so as to allow the light received thereby from the light source module 1 to reach the second incremental code sensor unit 32 by light transmission (i.e., the second incremental code photo sensors 321 receive light passing through the second incremental light barcode elements 232) when the second incremental light barcode element 232 is in a sensing zone of the second incremental code sensor unit 32; each of the second incremental dark barcode elements 233 is made of an opaque material to prevent the light received thereby from the light source module 1 from reaching the second incremental code sensor unit 32; each of the absolute light barcode elements 242 is made of a light-transmissible/non-opaque material, so as to allow the light received thereby from the light source module 1 to reach the absolute code sensor unit 33 by light transmission (i.e., the absolute code photo sensors 331 receive light passing through the absolute light barcode elements 242) when the absolute light barcode element 242 is in a sensing zone of the absolute code sensor unit 33; and each of the absolute dark barcode elements 243 is made of an opaque material to prevent the light received thereby from the light source module 1 from reaching the absolute code sensor unit 33.

The computational controller module 4 is electrically connected to the light source module 1, the first incremental code sensor unit 31, the second incremental code sensor unit 32 and the absolute code sensor unit 33, and is configured to perform signal conversion (e.g., analog-to-digital conversion on the electric signals from the photo sensors), signal processing (e.g., interpolation on the first and second incremental code signals, computation of a position based on the absolute code signal, the first incremental code signal and the second incremental code signal, etc.), and programmable control of, for example, light emission of the light source module 1. In practice, the computational controller module 4 may be disposed within a housing (not shown) that is separate from the light source module 1, the encoder module 2 and the sensor module 3.

Figure 4:
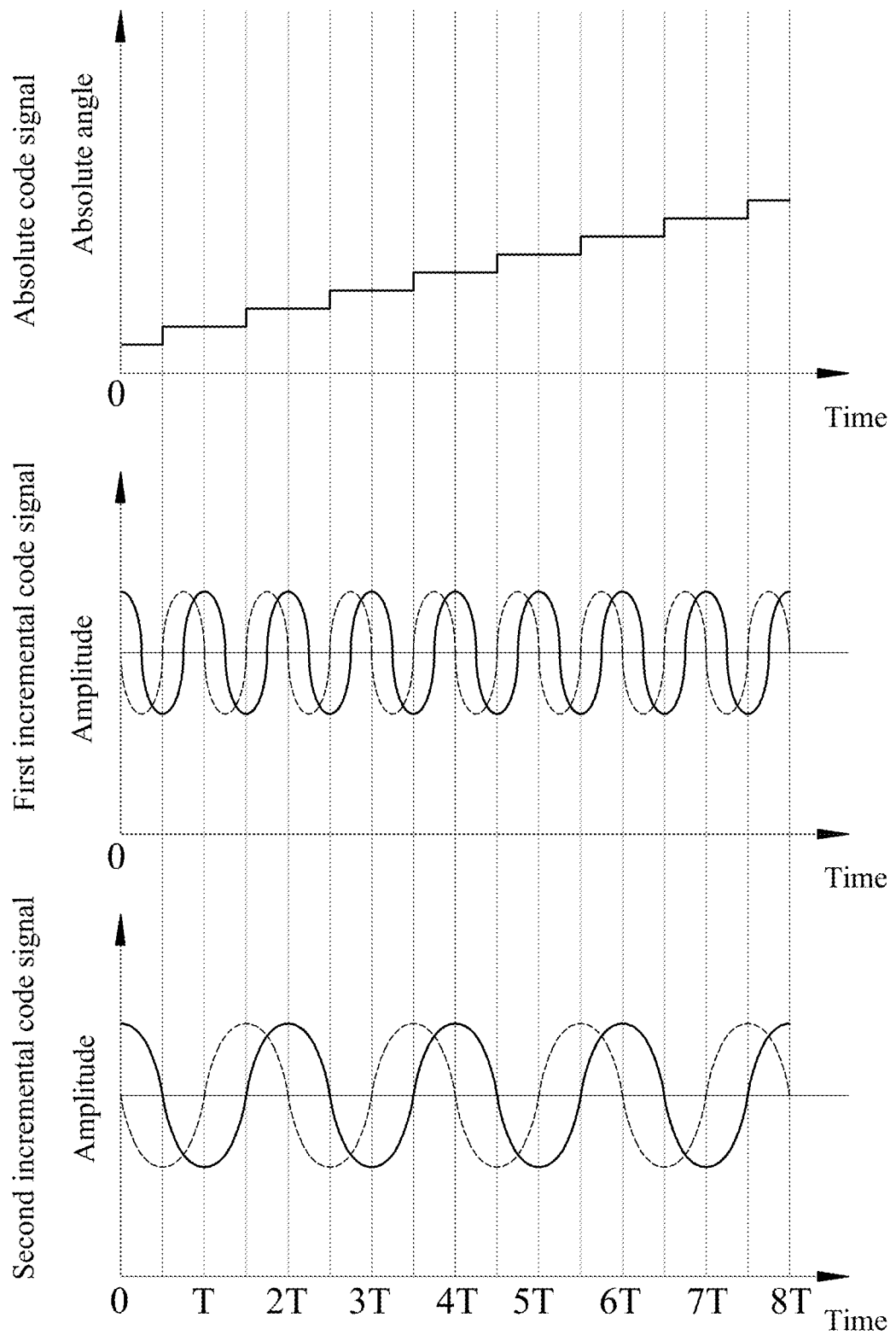
FIG. 4 is a waveform plot exemplarily showing a first incremental code signal, a second incremental code signal and an absolute code signal generated during operation of the optical positioning measurement device according to the disclosure, where the first and second incremental code signals are of analog types.

Referring to FIGS. 1, 3 and 4, the absolute code signal represents a number that indicates an absolute angle in a digital manner, and each of the first and second incremental code signals is an analog signal that includes sine wave signals having a phase difference therebetween.

Each of the first incremental code photo sensors 311 would, during stable rotation of the encoder body 21 around the axis (R) relative to the light source module 1 and the sensor module 3 along the circumferential direction (C), receive light with a maximum luminous flux when one of the first incremental light barcode elements 222 is aligned therewith, and receive light with a minimum luminous flux when one of the first incremental dark barcode elements 223 is aligned therewith. When the encoder body 21 stably rotates, for each of the first incremental code photo sensors 311, the first incremental light barcode elements 222 and the first incremental dark barcode elements 223 are alternately aligned with the first incremental code photo sensor 311 with a constant period of alteration, so a time length (T) between two successive receipts of the light with the maximum luminous flux (or minimum luminous flux) by the first incremental code photo sensor 311 is a period of the first incremental code signal, as shown in FIG. 4 (the peak-to-peak or valley-to-valley time length). Similarly, the second incremental code signal has a period of 2 T because each of the second incremental light barcode elements 232 and the second incremental dark barcode elements 233 has an angular width of 2 A, which is twice the angular width of each of the first incremental light barcode elements 222 and the first incremental dark barcode elements 223.

In this embodiment, the first incremental code sensor unit 31 includes four first incremental code photo sensors 311 that are arranged with an angular distance of 3.5 A between any adjacent pair thereof. The first and the third first incremental code photo sensors 311 (counted from the left side, and colored in light gray) constitute a first differential pair for the first incremental code signal, and the second and fourth first incremental code photo sensors 311 (colored in dark gray) constitute a second differential pair for the first incremental code signal, where the differential signaling is advantageous in resistance to electromagnetic noise.

In detail, the first and third first incremental code photo sensors 311 (or the second and fourth first incremental code photo sensors 311) are spaced apart by an angular distance of 7 A that corresponds to a time difference of 3.5 T between the respective electric signals, equaling 3.5 times the period of the first incremental code signal, so the phase difference between the electric signals provided by the first and third first incremental code photo sensors 311 (or the second and fourth first incremental code photo sensors 311) is 180 degrees. Since the two differential pairs are spaced apart by an angular distance of 3.5 A that corresponds to a time difference of 1.75 T, equaling 1.75 times the period of the first incremental code signal, the phase difference between the signals provided by the first and second differential pairs and constituting the first incremental code signal is 270 or 90 degrees. In FIG. 4, a plot for the first incremental code signal contains a solid curve and a dotted curve that represent signals provided by the first differential pair and the second differential pair, respectively.

Similarly, in this embodiment, the second incremental code sensor unit 32 includes four second incremental code photo sensors 321 that are arranged with an angular distance of 7 A between any adjacent pair thereof and that form two differential pairs. The first and third second incremental code photo sensors 321 constituting one differential pair (or the second and fourth second incremental code photo sensors 321 constituting the other differential pair) are spaced apart by an angular distance of 14 A that corresponds to a time difference of 7 T between the respective electric signals, equaling 3.5 times the period of the second incremental code signal, so the phase difference between the electric signals provided by the first and third second incremental code photo sensors 321 (or the second and fourth second incremental code photo sensors 321) is 180 degrees. Since the two differential pairs are spaced apart by an angular distance of 7 A that corresponds to a time difference of 3.5 T, equaling 1.75 times the period of the second incremental code signal, the phase difference between the signals provided by the differential pairs and constituting the second incremental code signal is 270 or 90 degrees. In FIG. 4, a plot for the second incremental code signal contains a solid curve and a dotted curve that represent signals provided by the differential pairs, respectively.

On the other hand, when the encoder body 21 stably rotates, although each of the absolute code photo sensors 331 receives light with a maximum luminous flux when one of the absolute light barcode elements 242 is aligned therewith, and receives light with a minimum luminous flux when one of the absolute dark barcode elements 243 is aligned therewith, the absolute code signal output by the absolute code sensor unit 33 is not a periodic signal because of the varying angular widths of the absolute light barcode elements 242 and the absolute dark barcode elements 243. Instead, as shown in FIG. 4, the absolute code signal is read as a digital signal that relates to an absolute angular position of the encoder body 21. In this embodiment, the absolute code sensor unit 33 includes four absolute code photo sensors 331 that are spaced apart equiangularly by an angular distance of 2 A, but this disclosure is not limited in this respect.

Since the quadrature signals (i.e., the signals that are 90 degrees out of phase) that are provided by the abovementioned differential pairs may have four different states in one period according to relative relationship therebetween, such property may be used to increase resolution of decoding. For example, in the plot for the second incremental code signal in FIG. 4, if a period from 0 to 2 T is divided into four equal regions, variation of the amplitude of the sine wave represented by the solid curve is "falling"-"falling"-"rising"-"rising", and variation of the amplitude of the sine wave represented by the dotted curve is "falling"-"rising"-"rising"-"falling". Accordingly, the combination of the two sine waves has four states: "falling/falling"-"falling/rising"-"rising-rising"-"rising/falling" in one period of the second incremental code signal.

As a result, the resolution of decoding the second incremental code signal may be enhanced from 2 A (corresponding to half of the 2 T period in the case of a single sine wave having only two states of rising and falling) to 1 A (corresponding to a quarter of the 2 T period) in terms of the angular distance by distinguishing/identifying the abovementioned four states. In other words, an angular distance of 4 A that covers a pair of a second incremental light barcode element 232 and a second incremental dark barcode element 233 is divided into four equal divisions each having an angular width of A. Similarly, the resolution of decoding the first incremental code signal can be enhanced from A to 0.5 A by using the quadrature sine waves of the first incremental code signal.

The computational controller module 4 receives and analyzes the first incremental code signal, the second incremental code signal and the absolute code signal, so as to output a positioning signal relating to movement of the encoder module 2 relative to the light source module 1. In this embodiment, the computational controller module 4 first acquires an absolute angle of which the resolution is relatively low based on the absolute code signal. For example, when the encoder body 21 stops at an absolute angle of 152°, the computational controller module 4 may acquire 152° from the absolute code signal first, then acquire a more precise angle of 152.6° based on the second incremental code signal, and acquire an even more precise angle of 152.67° based on the first incremental code signal.

Figure 5:
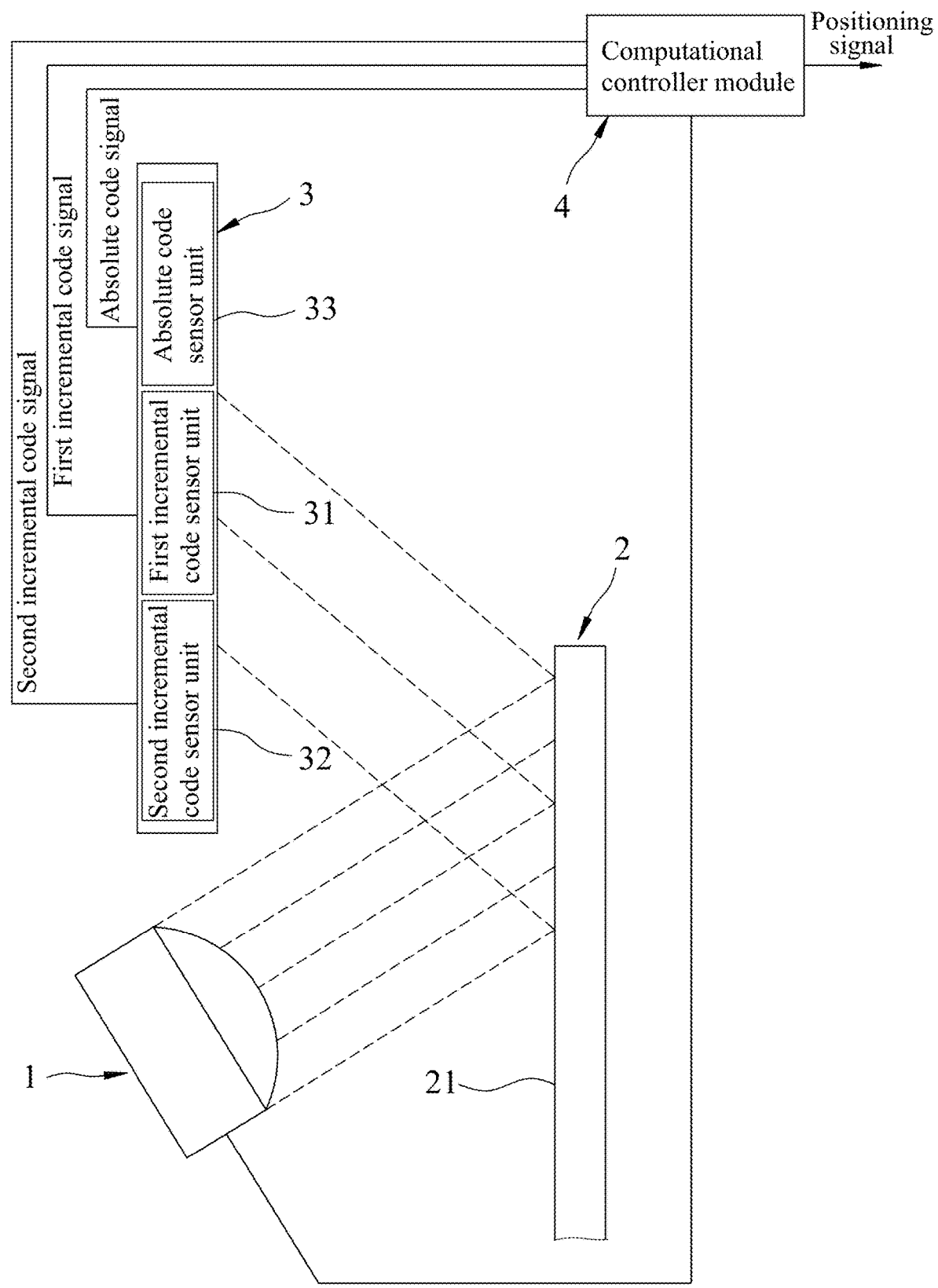
FIG. 5 is a schematic block diagram illustrating a variation of the first embodiment, where the optical positioning measurement device is of a light-reflective and rotary type.

In a variation of the first embodiment, as shown in FIG. 5, the light source module 1 and the sensor module 3 may be disposed at the same side of the encoder module 2. In this case, the encoder body 21 is made of a material which is not light-reflective (a non-reflective material); each of the first incremental light barcode elements 222 (see FIG. 3) is made of a light-reflective material, which may be coated on the encoder body 21, so as to allow the light received thereby from the light source module 1 to reach the first incremental code sensor unit 31 by light reflection (i.e., the first incremental code photo sensors 311 (see FIG. 3) receive light reflected by the first incremental light barcode elements 222) when the first incremental light barcode element 222 is in a sensing zone of the first incremental code sensor unit 31; each of the first incremental dark barcode elements 223 (see FIG. 3) is made of a non-reflective material to prevent the light received thereby from the light source module 1 from reaching the first incremental code sensor unit 31; each of the second incremental light barcode elements 232 (see FIG. 3) is made of a light-reflective material, so as to allow the light received thereby from the light source module 1 to reach the second incremental code sensor unit 32 by light reflection (i.e., the second incremental code photo sensors 321 receive light reflected by the second incremental light barcode elements 232) when the second incremental light barcode element 232 is in a sensing zone of the second incremental code sensor unit 32; each of the second incremental dark barcode elements 233 (see FIG. 3) is made of a non-reflective material to prevent the light received thereby from the light source module 1 from reaching the second incremental code sensor unit 32; each of the absolute light barcode elements 242 is made of a light-reflective material, so as to allow the light received thereby from the light source module 1 to reach the absolute code sensor unit 33 by light reflection (i.e., the absolute code photo sensors 331 receive light reflected by the absolute light barcode elements 242) when the absolute light barcode element 242 is in a sensing zone of the absolute code sensor unit 33; and each of the absolute dark barcode elements 243 (see FIG. 3) is made of a non-reflective material to prevent the light received thereby from the light source module 1 from reaching the absolute code sensor unit 33.

Figure 6:
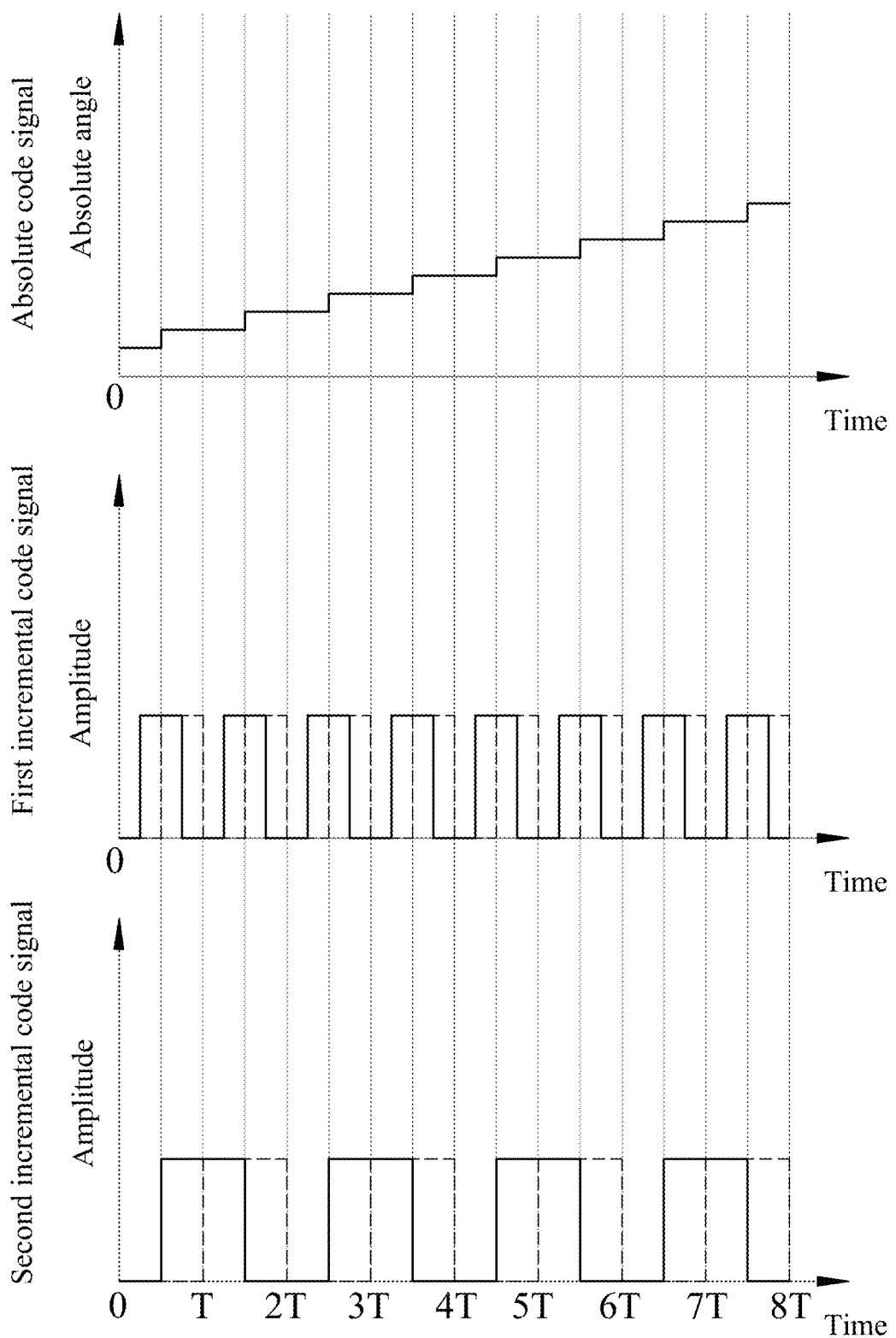
FIG. 6 is a waveform plot exemplarily showing the first incremental code signal, the second incremental code signal and the absolute code signal generated during operation of the optical positioning measurement device according to the disclosure, where the first and second incremental code signals are of digital types.

In another variation of the first embodiment, as shown in FIG. 6, the first and second incremental code signals may be digital signals (e.g., each including square waves that have a time difference therebetween) by, for example, adding an analog-to-digital conversion circuit for each of the first incremental code sensor unit 31, the second incremental code sensor unit 32 and the absolute code sensor unit 33.

Similarly, because the quadrature square waves may have four different states in one period according to relative relationship therebetween, such property may be used to increase resolution of decoding. For example, in the plot for the second incremental code signal in FIG. 6, if a period from 0 to 2 T is divided into four equal regions, variation of the square wave represented by the solid curve is "low"-"high"-"high"-"low", and variation of the square wave represented by the dotted curve is "low"-"low"-"high"-"high". Accordingly, the combination of the two square waves has four states: "low/low"-"high/low"-"high-high"-"low/high" in one period of the second incremental code signal.

As a result, the resolution of decoding the second incremental code signal may be enhanced from 2 A (corresponding to half of the 2 T period in the case of a single square wave having only two states of high and low) to A (corresponding to a quarter of the 2 T period) in terms of the angular distance by distinguishing/identifying the abovementioned four states. In other words, an angular distance of 4 A that covers a pair of a second incremental light barcode element 232 and a second incremental dark barcode element 233 is divided into four equal divisions each having an angular width of A. Similarly, the resolution of decoding the first incremental code signal can be enhanced from A to 0.5 A by using the quadrature square waves of the first incremental code signal.

Accordingly, the first embodiment is advantageous in that:

1. In addition to the absolute code portion 24 from which a relatively rough absolute position can be acquired, this embodiment further includes two incremental code portions 23, 24 to acquire relatively precise incremental position on the basis of the absolute position that is already known. By virtue of the absolute code portion 24, resetting to the origin is not required every time the optical positioning measurement device is turned on; in addition, the incremental code portions 23, 24 effectively increase resolution of the positioning measurement.

2. For each of the first and second incremental code sensor units 31, 32, the photo sensors 311, 321 thereof are arranged such that the resultant first incremental code signal or second incremental code signal includes differential sine wave signals that are quadrature signals. Such arrangement may further increase resolution of the positioning measurement without changing the incremental code arrangement.

Figure 7:
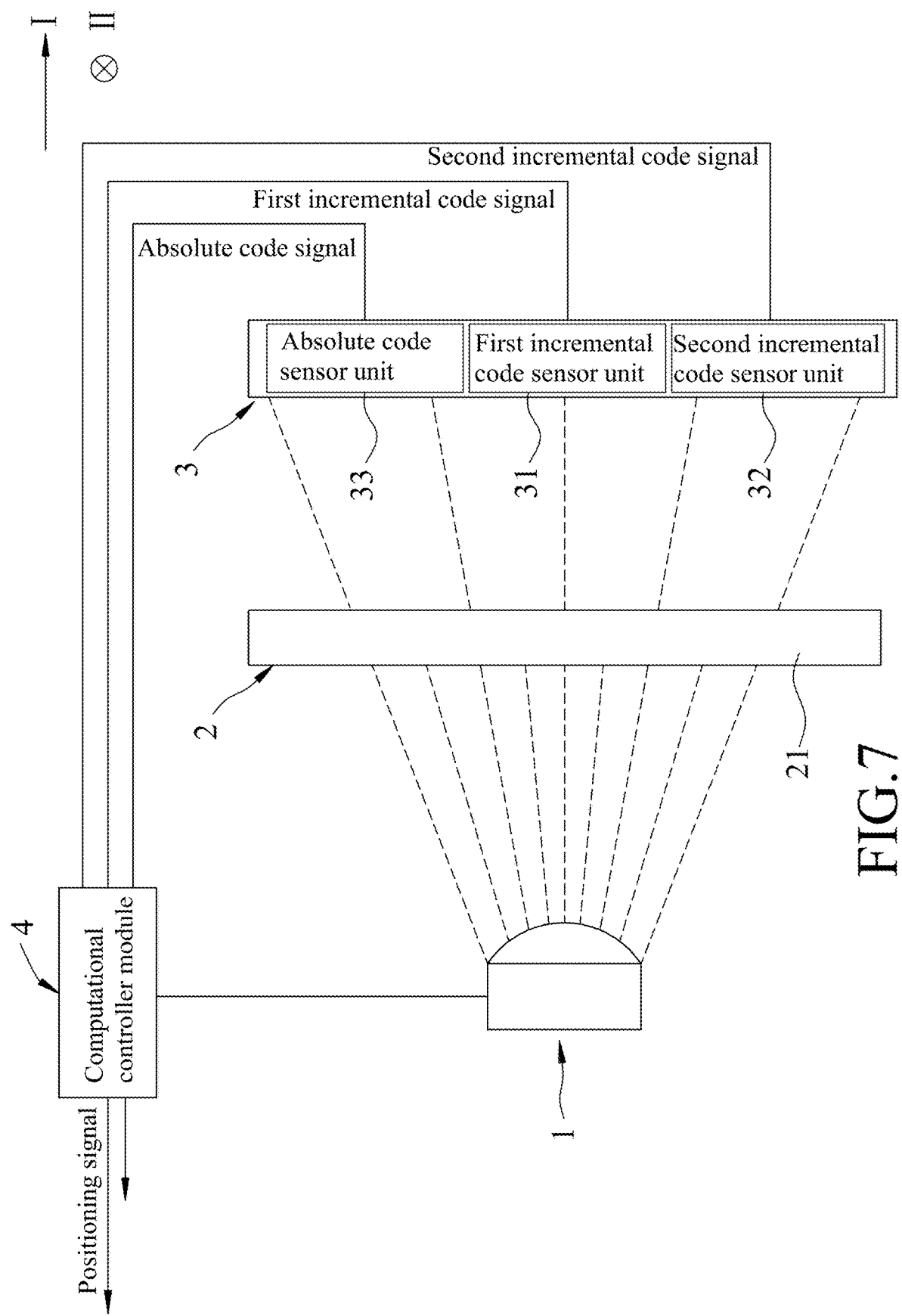
FIG. 7 is a schematic block diagram illustrating a second embodiment of an optical positioning measurement device according to the disclosure, where the optical positioning measurement device is of a light-transmissive and linear type.
Figure 8:
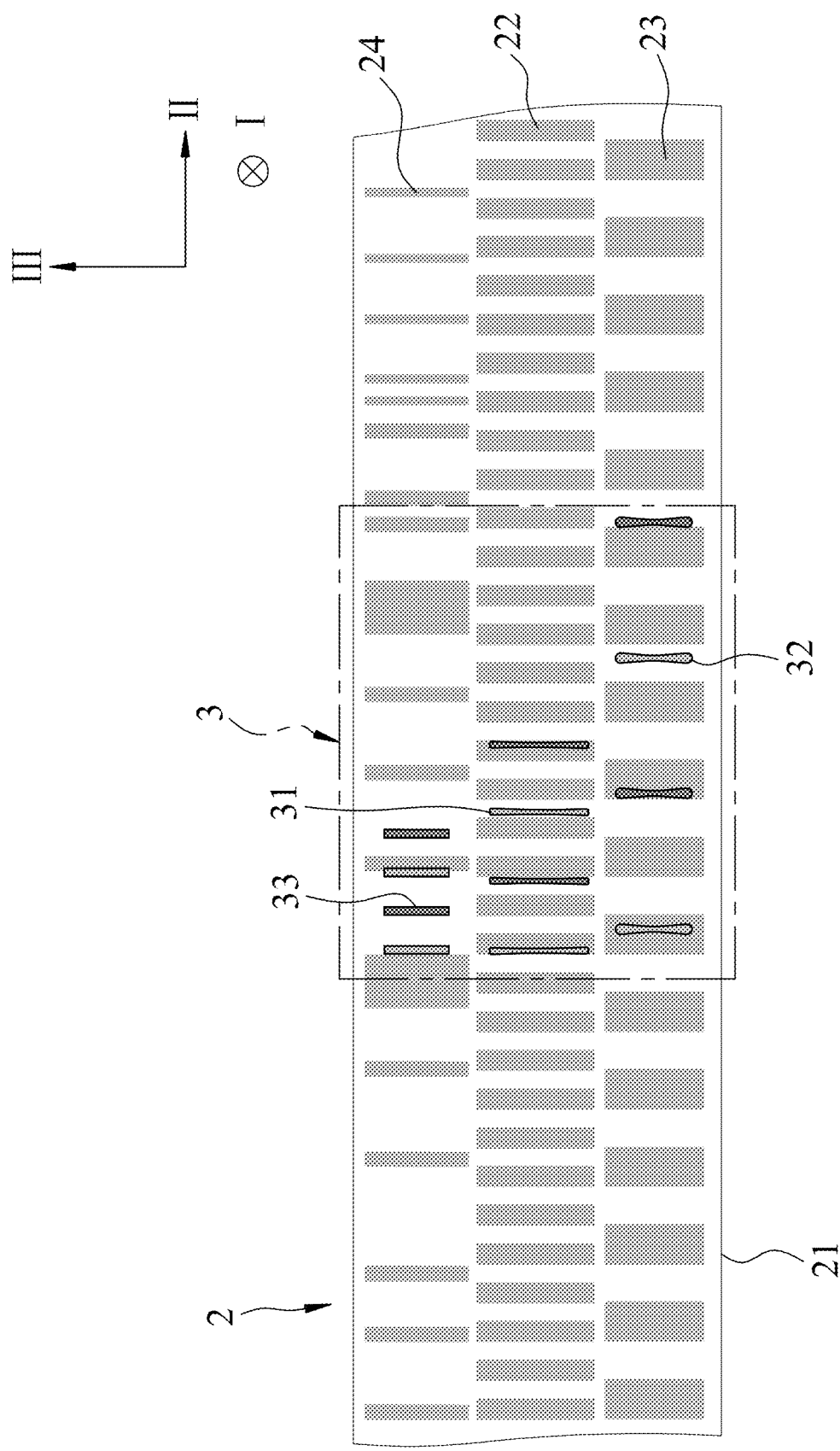
FIG. 8 is a fragmentary view illustrating an arrangement between an encoder module and a sensor module of the second embodiment.
Figure 9:
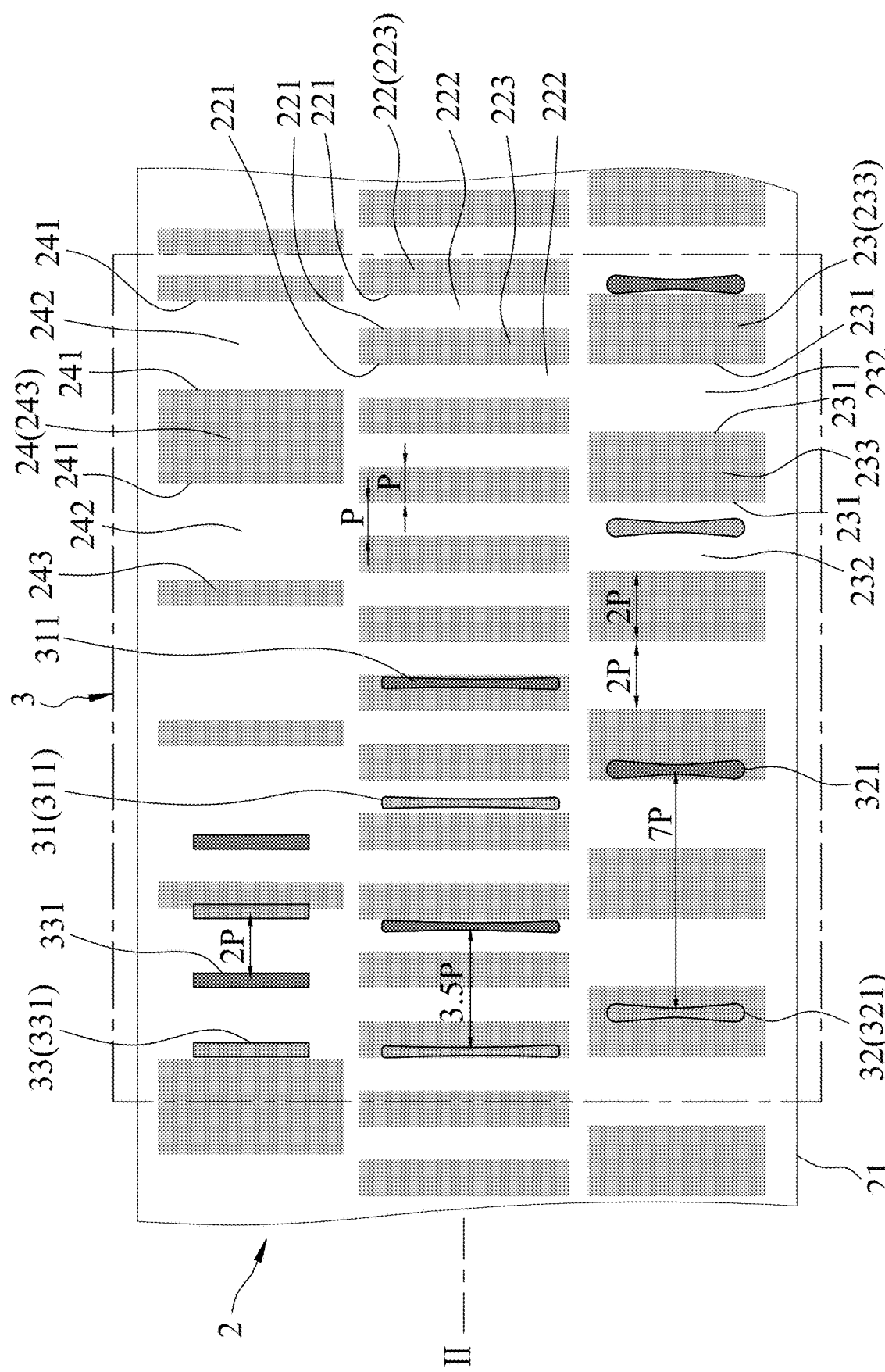
FIG. 9 is an enlarged fragmentary view of FIG. 8.

Referring to FIGS. 7 through 9, a second embodiment of the optical positioning measurement device according to this disclosure is shown to be similar to the first embodiment.

In the second embodiment, the encoder module 2 is a rectangular plate that extends in a second direction (II) perpendicular to the first direction (I) (namely, a lengthwise direction of the rectangular plate is along the second direction (II)), and is linearly movable relative to the light source module 1 and the sensor module 3 along the second direction (II). The second incremental code portion 23, the first incremental code portion 22 and the absolute code portion 24 are arranged in order along a third direction (III) that is perpendicular to the first and second directions (I, II), but this disclosure is not limited in this respect.

The first incremental code portion 22 has a plurality of first incremental barcode pattern boundaries 221 that are equidistantly arranged (equally distributed in a linear manner) along the second direction (II) by a linear distance of P and that define a plurality of first incremental light barcode elements 222, and a plurality of first incremental dark barcode elements 223. Arbitrary successive three of the first incremental barcode pattern boundaries 221 cooperatively define one of the first incremental light barcode elements 222 and one of the first incremental dark barcode elements 223 that are adjacent to each other.

The second incremental code portion 23 has a plurality of second incremental barcode pattern boundaries 231 that are equidistantly arranged along the second direction (II) by a linear distance of 2 P and that define a plurality of second incremental light barcode elements 232, and a plurality of second incremental dark barcode elements 233. Arbitrary successive three of the second incremental barcode pattern boundaries 231 cooperatively define one of the second incremental light barcode elements 232 and one of the second incremental dark barcode elements 233 that are adjacent to each other.

The absolute code portion 24 has a plurality of absolute barcode pattern boundaries 241 that are arranged along the second direction (II) and that define a plurality of absolute light barcode elements 242 and a plurality of absolute dark barcode elements 243. Arbitrary successive three of the absolute barcode pattern boundaries 241 cooperatively define one of the absolute light barcode elements 242 and one of the absolute dark barcode elements 243 that are adjacent to each other. The absolute light barcode elements 242 and the absolute dark barcode elements 243 are arranged along the second direction (II) according to a specific encoding format, so linear distances among the absolute barcode pattern boundaries 241 may vary.

The first incremental code sensor unit 31 includes a plurality of first incremental code photo sensors 311 that are equidistantly arranged along the second direction (II) where a geometric center of each of the first incremental code photo sensors 311 is spaced apart from that of an adjacent one of the first incremental code photo sensors 311 by a linear distance of P×(N−0.5), where N is a positive integer. The second incremental code sensor unit 32 includes a plurality of second incremental code photo sensors 321 that are equidistantly arranged along the second direction (II) where a geometric center of each of the second incremental code photo sensors 321 is spaced apart from that of an adjacent one of the second incremental code photo sensors 321 by a linear distance of 2 P×(N−0.5). The absolute code sensor unit 33 includes a plurality of absolute code photo sensors 331 that are equidistantly arranged along the second direction (II) where a geometric center of each of the absolute code photo sensors 331 is spaced apart from that of an adjacent one of the absolute code photo sensors 331 by a linear distance of 2 P. In this embodiment, N=4, but this disclosure is not limited in this respect.

In this embodiment, the encoder body 21 is made of a light-transmissible/non-opaque material (e.g., transparent glass); each of the first incremental light barcode elements 222, the second incremental light barcode elements 232 and the absolute light barcode elements 242 is made of a light-transmissible/non-opaque material, so as to allow the light received thereby from the light source module 1 to reach the corresponding sensor unit 31, 32, 33 by light transmission when the light barcode element 222, 232, 242 is in a sensing zone of the corresponding sensor unit 31, 32, 33; and each of the first incremental dark barcode elements 223, the second incremental dark barcode elements 233 and the absolute dark barcode elements 243 is made of an opaque material, which may be coated on the encoder body 21, to prevent the light received thereby from the light source module 1 from reaching the corresponding sensor unit 31, 32, 33.

Similar to the first embodiment, in the second embodiment, the absolute code signal represents a number that indicates an absolute angle in a digital manner, and each of the first and second incremental code signals is an analog signal that includes sine wave signals having a phase difference therebetween.

Each of the first incremental code photo sensors 311 would, during stable movement of the encoder body 21 relative to the light source module 1 and the sensor module 3 along the second direction (II), receive light with a maximum luminous flux when one of the first incremental light barcode elements 222 is aligned therewith, and receive light with a minimum luminous flux when one of the first incremental dark barcode elements 223 is aligned therewith. When the encoder body 21 stably moves, for each of the first incremental code photo sensors 311, the first incremental light barcode elements 222 and the first incremental dark barcode elements 223 are alternately aligned with the first incremental code photo sensor 311 with a constant period of alteration, so a time length (T) between two successive receipts of the light with the maximum luminous flux (or minimum luminous flux) by the first incremental code photo sensor 311 is a period of the first incremental code signal, as shown in FIG. 4 (the peak-to-peak or valley-to-valley time length). Similarly, the second incremental code signal has a period of 2 T because each of the second incremental light barcode elements 232 and the second incremental dark barcode elements 233 has a width of 2 P, which is twice the width of each of the first incremental light barcode elements 222 and the first incremental dark barcode elements 223.

In this embodiment, the first incremental code sensor unit 31 includes four first incremental code photo sensors 311 that are arranged with a linear distance of 3.5 P between any adjacent pair thereof and that form two differential pairs where the photo sensors 311 forming one differential pair arranged alternately with the photo sensors 311 forming another differential pair; the second incremental code sensor unit 32 includes four second incremental code photo sensors 321 that are arranged with a linear distance of 7 P between any adjacent pair thereof and that form two differential pairs where the photo sensors 321 forming one differential pair arranged alternately with the photo sensors 321 forming another differential pair; and the absolute code sensor unit 33 includes four absolute code photo sensors 331 that are spaced apart equiangularly by a linear distance of 2 P. However, this disclosure is not limited to such specific implementation.

Similar to the first embodiment, the resolution of decoding the second incremental code signal can be enhanced from 2 P to P by identifying the four states of the quadrature sine waves of the second incremental code signal. In other words, a linear distance of 4 P that covers a pair of a second incremental light barcode element 231 and a second incremental dark barcode element 232 is divided into four equal divisions each having a width of P. Similarly, the resolution of decoding the first incremental code signal can be enhanced from P to 0.5 P by identifying the four states of the quadrature sine waves of the first incremental code signal.

In the second embodiment, the computational controller module 4 first acquires an absolute position of which the resolution is relatively low based on the absolute code signal. For example, when the encoder body stops at an absolute position of 168 mm, the computational controller module 4 may acquire 168 mm from the absolute code signal first, then acquire a more precise position of 168.6 mm based on the second incremental code signal, and acquire an even more precise position of 168.68 mm based on the first incremental code signal.

In a variation of the second embodiment, as shown in FIG. 5, the light source module 1 and the sensor module 3 may be disposed at the same side of the encoder module 2. In this case, the encoder body 21 is made of a non-reflective material; each of the first incremental light barcode elements 222, the second incremental light barcode elements 232 and the absolute light barcode elements 242 is made of a light-reflective material, which may be coated on the encoder body 21, so as to allow the light received thereby from the light source module 1 to reach the corresponding sensor unit 31, 32, 33 by light reflection when the light barcode element 222, 232, 242 is in a sensing zone of the corresponding sensor unit 31, 32, 33; and each of the first incremental dark barcode elements 223, the second incremental dark barcode elements 233 and the absolute dark barcode elements 243 is made of a non-reflective material to prevent the light received thereby from the light source module 1 from reaching the corresponding sensor unit 31, 32, 33.

In another variation of the second embodiment, as shown in FIG. 6, the first and second incremental code signals may be digital signals (e.g., each including square waves that have time difference therebetween) by, for example, adding an analog-to-digital conversion circuit for each of the first incremental code sensor unit 31, the second incremental code sensor unit 32 and the absolute code sensor unit 33. By identifying the four states of the quadrature square waves, resolution of decoding the second incremental code signal can be enhanced from 2 P to P, and resolution of decoding the first incremental code signal can be enhanced from P to 0.5 P.

Accordingly, the concept of this disclosure is applicable to both of rotary encoding (the first embodiment) and linear encoding (the second embodiment).

In summary, the optical positioning measurement device according to this disclosure not only has advantages of both of absolute encoding and incremental encoding, but also includes two incremental code portions to further enhance the resolution of decoding.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An optical positioning measurement device, comprising:
  a light source module operable to emit light;
  an encoder module disposed to be illuminated by said light source, and movable relative to said light source module, said encoder module including an encoder body, and further including a first incremental code portion, a second incremental code portion and an absolute code portion that are disposed on said encoder body; and
  a sensor module disposed to receive light provided by said light source module via said encoder module, and configured to output electric signal relating to luminous flux of light received thereby, said sensor module including:
    a first incremental code sensor unit corresponding in position to said first incremental code portion for receiving light provided via said first incremental code portion, and configured to output a first incremental code signal relating to light received thereby;
    a second incremental code sensor unit corresponding in position to said second incremental code portion for receiving light provided via said second incremental code portion, and configured to output a second incremental code signal relating to light received thereby; and an absolute code sensor unit corresponding in position to said absolute code portion for receiving light provided via said absolute code portion, and configured to output an absolute code signal relating to light received thereby;

wherein said light source module, said encoder module and said sensor module are spaced apart from each other in a first direction; and said first incremental code portion includes a plurality of first incremental code patterns that are equally distributed along a second direction on said encoder body, and said second incremental code portion includes a plurality of second incremental code patterns that are equally distributed along the second direction on said encoder body, where said second incremental code patterns are arranged more loosely than said first incremental code patterns;

said optical positioning measurement device further comprising a computational controller module electrically connected to said light source module, said absolute code sensor unit, said first incremental code sensor unit and said second incremental code sensor unit for receiving the absolute code signal, the first incremental code signal and the second incremental code signal, respectively, said computational controller module being configured to perform analysis on the absolute code signal, the first incremental code signal and the second incremental code signal to output a positioning signal relating to movement of said encoder module relative to said light source module;

wherein:

said encoder module is rotatably movable around an axis relative to said light source module and said sensor module;

said encoder body surrounds the axis along a circumferential direction, the circumferential direction serving as the second direction;

said first incremental code portion has a plurality of first incremental barcode pattern boundaries that are equiangularly arranged along the circumferential direction by an angular distance of A and that define a plurality of first incremental light barcode elements and a plurality of first incremental dark barcode elements;

arbitrary successive three of said first incremental barcode pattern boundaries cooperatively define one of the first incremental light barcode elements and one of the first incremental dark barcode elements that are adjacent to each other;

each of said first incremental light barcode element is configured to allow the light received thereby from said light source module to reach said first incremental code sensor unit when said first incremental light barcode element is in a sensing zone of said first incremental code sensor unit, and said first incremental dark barcode elements are configured to prevent the light received thereby from said light source module from reaching said first incremental code sensor unit;

said first incremental code sensor unit includes a plurality of first incremental code photo sensors that are equiangularly arranged along the circumferential direction; and a geometric center of each of said first incremental code photo sensors is spaced apart from that of an adjacent one of said first incremental code photo sensors by an angular distance of $A \times (N-0.5)$, where N is a positive integer.

2. The optical positioning measurement device of claim 1, wherein:

said second incremental code portion has a plurality of second incremental barcode pattern boundaries that are equiangularly arranged along the circumferential direction by an angular distance of 2 A and that define a plurality of second incremental light barcode elements and a plurality of second incremental dark barcode elements;

arbitrary successive three of said second incremental barcode pattern boundaries cooperatively define one of the second incremental light barcode elements and one of the second incremental dark barcode elements that are adjacent to each other;

each of said second incremental light barcode elements is configured to allow the light received thereby from said light source module to reach said second incremental code sensor unit when said second incremental light barcode element is in a sensing zone of said second incremental code sensor unit, and said second incremental dark barcode elements are configured to prevent the light received thereby from said light source module from reaching said second incremental code sensor unit;

said second incremental code sensor unit includes a plurality of second incremental code photo sensors that are equiangularly arranged along the circumferential direction; and a geometric center of each of said second incremental code photo sensors is spaced apart from that of an adjacent one of said second incremental code photo sensors by an angular distance of $2 A \times (N-0.5)$.

3. The optical positioning measurement device of claim 2, wherein:

said absolute code portion has a plurality of absolute barcode pattern boundaries that are angularly spaced apart from each other along the circumferential direction and that define a plurality of absolute light barcode elements and a plurality of absolute dark barcode elements;

arbitrary successive three of said absolute barcode pattern boundaries cooperatively define one of the absolute light barcode elements and one of the absolute dark barcode elements that are adjacent to each other;

each of said absolute light barcode elements is configured to allow the light received thereby from said light source module to reach said absolute code sensor unit when said absolute light barcode element is in a sensing zone of said absolute code sensor unit, and said second incremental dark barcode elements are configured to prevent the light received thereby from said light source module from reaching said absolute code sensor unit;

said absolute code sensor unit includes a plurality of absolute code photo sensors that are equiangularly arranged along the circumferential direction; and a geometric center of each of said absolute code photo sensors is spaced apart from that of an adjacent one of said absolute code photo sensors by an angular distance of 2 A.

4. The optical positioning measurement device of claim 3, wherein:

said light source module and said sensor module are disposed at opposite sides of said encoder module;

said encoder body is made of a light-transmissible material;

each of said first incremental light barcode elements, said second incremental light barcode elements and said absolute light barcode elements is made of a light-transmissible material;

each of said first incremental dark barcode elements, said second incremental dark barcode elements and said absolute dark barcode elements is made of an opaque material; and the absolute code signal represents a number in a digital manner.

5. The optical positioning measurement device of claim 3, wherein:

said light source module and said sensor module are disposed at a same side of said encoder module;

said encoder body is made of a material which is not light-reflective;

each of said first incremental light barcode elements, said second incremental light barcode elements and said absolute light barcode elements is made of a light-reflective material;

each of said first incremental dark barcode elements, said second incremental dark barcode elements and said absolute dark barcode elements is made of a material which is not light-reflective; and the absolute code signal represents a number in a digital manner.

6. An optical positioning measurement device, comprising:

a light source module operable to emit light;

an encoder module disposed to be illuminated by said light source, and movable relative to said light source module, said encoder module including an encoder body, and further including a first incremental code portion, a second incremental code portion and an absolute code portion that are disposed on said encoder body; and a sensor module disposed to receive light provided by said light source module via said encoder module, and configured to output electric signal relating to luminous flux of light received thereby, said sensor module including:

a first incremental code sensor unit corresponding in position to said first incremental code portion for receiving light provided via said first incremental code portion, and configured to output a first incremental code signal relating to light received thereby;

a second incremental code sensor unit corresponding in position to said second incremental code portion for receiving light provided via said second incremental code portion, and configured to output a second incremental code signal relating to light received thereby; and an absolute code sensor unit corresponding in position to said absolute code portion for receiving light provided via said absolute code portion, and configured to output an absolute code signal relating to light received thereby;

wherein said light source module, said encoder module and said sensor module are spaced apart from each other in a first direction; and said first incremental code portion includes a plurality of first incremental code patterns that are equally distributed along a second direction on said encoder body, and said second incremental code portion includes a plurality of second incremental code patterns that are equally distributed along the second direction on said encoder body, where said second incremental code patterns are arranged more loosely than said first incremental code patterns;

said optical positioning measurement device further comprising a computational controller module electrically connected to said light source module, said absolute code sensor unit, said first incremental code sensor unit and said second incremental code sensor unit for receiving the absolute code signal, the first incremental code signal and the second incremental code signal, respectively, said computational controller module being configured to perform analysis on the absolute code signal, the first incremental code signal and the second incremental code signal to output a positioning signal relating to movement of said encoder module relative to said light source module;

wherein:

said encoder module is linearly movable relative to said light source module and said sensor module along the second direction, the second direction being perpendicular to the first direction;

said first incremental code portion has a plurality of first incremental barcode pattern boundaries that are equidistantly arranged along the second direction by a linear distance of P and that define a plurality of first incremental light barcode elements and a plurality of first incremental dark barcode elements;

arbitrary successive three of said first incremental barcode pattern boundaries cooperatively define one of the first incremental light barcode elements and one of the first incremental dark barcode elements that are adjacent to each other;

each of said first incremental light barcode elements is configured to allow the light received thereby from said light source module to reach said first incremental code sensor unit when said first incremental light barcode element is in a sensing zone of said first incremental code sensor unit, and said first incremental dark barcode elements are configured to prevent the light received thereby from said light source module from reaching said first incremental code sensor unit;

said first incremental code sensor unit includes a plurality of first incremental code photo sensors that are equidistantly arranged along the second direction; and a geometric center of each of said first incremental code photo sensors is spaced apart from that of an adjacent one of said first incremental code photo sensors by a linear distance of $P \times (N-0.5)$, where N is a positive integer.

7. The optical positioning measurement device of claim 6, wherein:

said second incremental code portion has a plurality of second incremental barcode pattern boundaries that are equidistantly arranged along the second direction by a linear distance of 2 P and that define a plurality of second incremental light barcode elements and a plurality of second incremental dark barcode elements;

arbitrary successive three of said second incremental barcode pattern boundaries cooperatively define one of the second incremental light barcode elements and one of the second incremental dark barcode elements that are adjacent to each other;

each of said second incremental light barcode elements is configured to allow the light received thereby from said light source module to reach said second incremental code sensor unit when said second incremental light barcode element is in a sensing zone of said second incremental code sensor unit, and said second incremental dark barcode elements are configured to prevent the light received thereby from said light source module from reaching said second incremental code sensor unit;

said second incremental code sensor unit includes a plurality of second incremental code photo sensors that are equidistantly arranged along the second direction; and a geometric center of each of said second incremental code photo sensors is spaced apart from that of an adjacent one of said second incremental code photo sensors by an angular distance of 2 P×(N−0.5).

8. The optical positioning measurement device of claim 7, wherein:

said absolute code portion has a plurality of absolute barcode pattern boundaries that are linearly spaced apart from each other along the second direction and that define a plurality of absolute light barcode elements and a plurality of absolute dark barcode elements;

arbitrary successive three of said absolute barcode pattern boundaries cooperatively define one of the absolute light barcode elements and one of the absolute dark barcode elements that are adjacent to each other;

each of said absolute light barcode elements is configured to allow the light received thereby from said light source module to reach said absolute code sensor unit when said absolute barcode element is in a sensing zone of said absolute code sensor unit, and said absolute dark barcode elements are configured to prevent the light received thereby from said light source module from reaching said absolute code sensor unit;

said absolute code sensor unit includes a plurality of absolute code photo sensors that are equidistantly arranged along the second direction; and a geometric center of each of said absolute code photo sensors is spaced apart from that of an adjacent one of said absolute code photo sensors by an angular distance of 2 P.

9. The optical positioning measurement device of claim 8, wherein:

said light source module and said sensor module are disposed at opposite sides of said encoder module;

said encoder body is made of a light-transmissible material;

each of said first incremental light barcode elements, said second incremental light barcode elements and said absolute light barcode elements is made of a light-transmissible material;

each of said first incremental dark barcode elements, said second incremental dark barcode elements and said absolute dark barcode elements is made of an opaque material; and the absolute code signal represents a number in a digital manner.

10. The optical positioning measurement device of claim 8, wherein:

said light source module and said sensor module are disposed at a same side of said encoder module;

said encoder body is made of a material which is not light-reflective;

each of said first incremental light barcode elements, said second incremental light barcode elements and said absolute light barcode elements is made of a light-reflective material;

each of said first incremental dark barcode elements, said second incremental dark barcode elements and said absolute dark barcode elements is made of a material which is not light-reflective; and the absolute code signal represents a number in a digital manner.

* * * * *